Oct. 28, 1952 E. OLSON 2,615,694
CARBURETOR
Filed Feb. 18, 1949 10 Sheets-Sheet 1
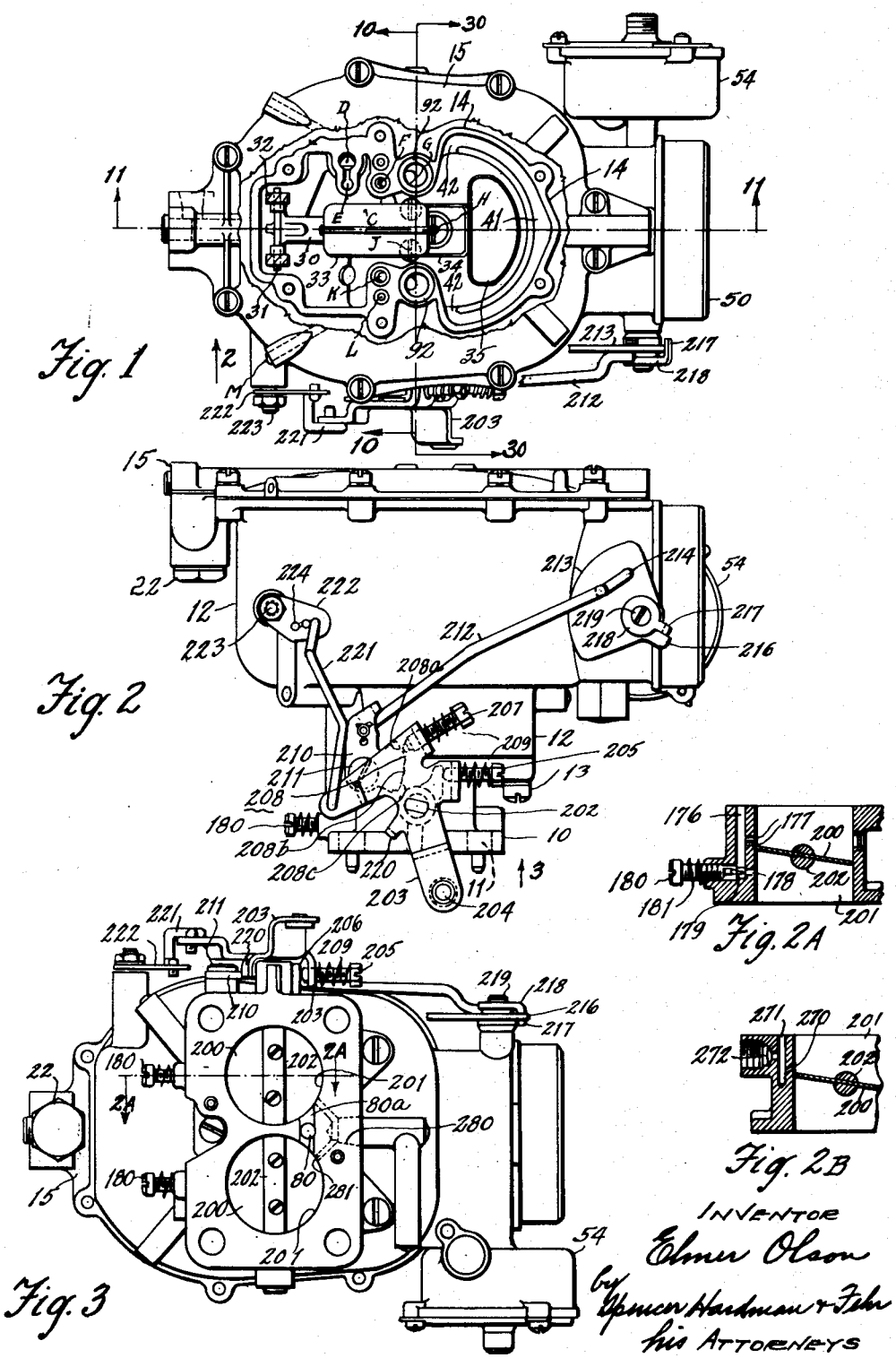

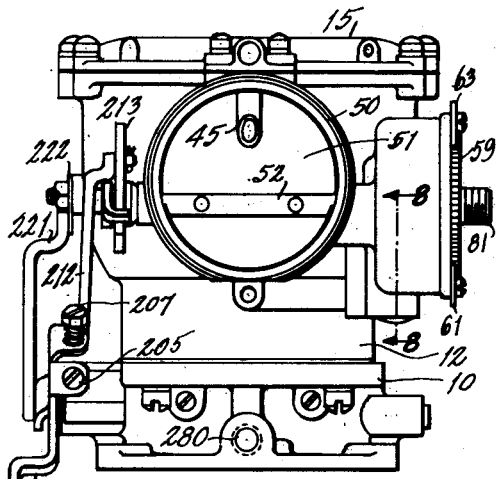

Oct. 28, 1952 E. OLSON 2,615,694
CARBURETOR
Filed Feb. 18, 1949 10 Sheets-Sheet 3
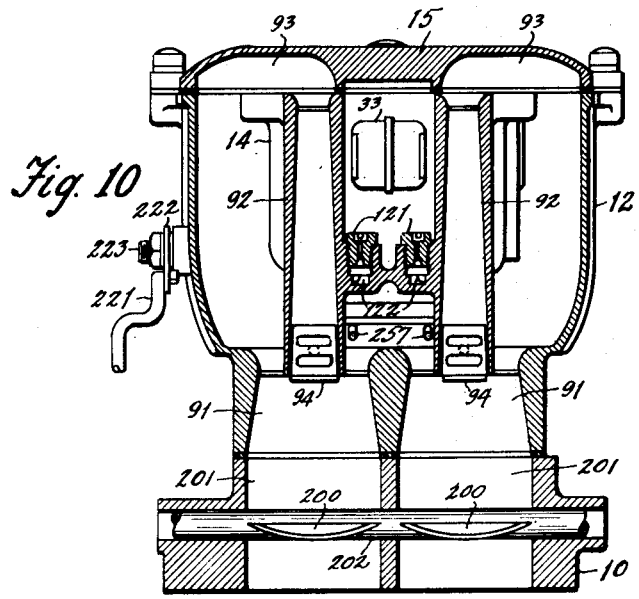
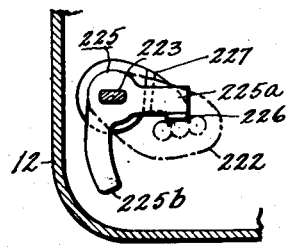
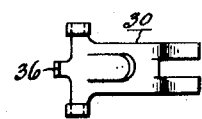
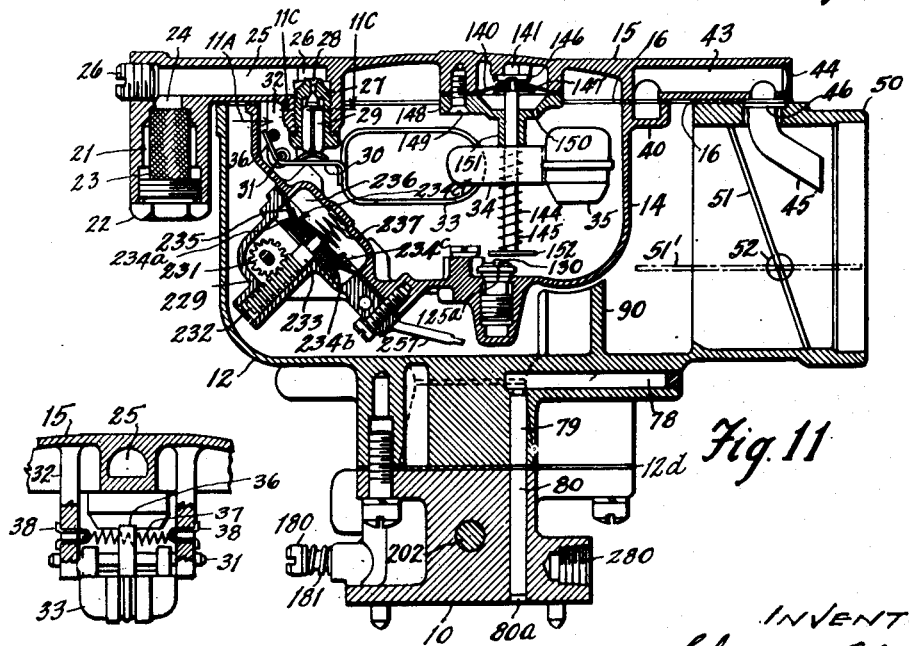
INVENTOR
Elmer Olson
by Spencer Hardman & Fehr
his ATTORNEYS Oct. 28, 1952 — E. OLSON — 2,615,694
CARBURETOR
Filed Feb. 18, 1949 — 10 Sheets-Sheet 4

INVENTOR
Elmer Olson
BY Spencer Hardman & Fehr
HIS ATTORNEYS

Oct. 28, 1952  E. OLSON  2,615,694
CARBURETOR
Filed Feb. 18, 1949  10 Sheets-Sheet 5
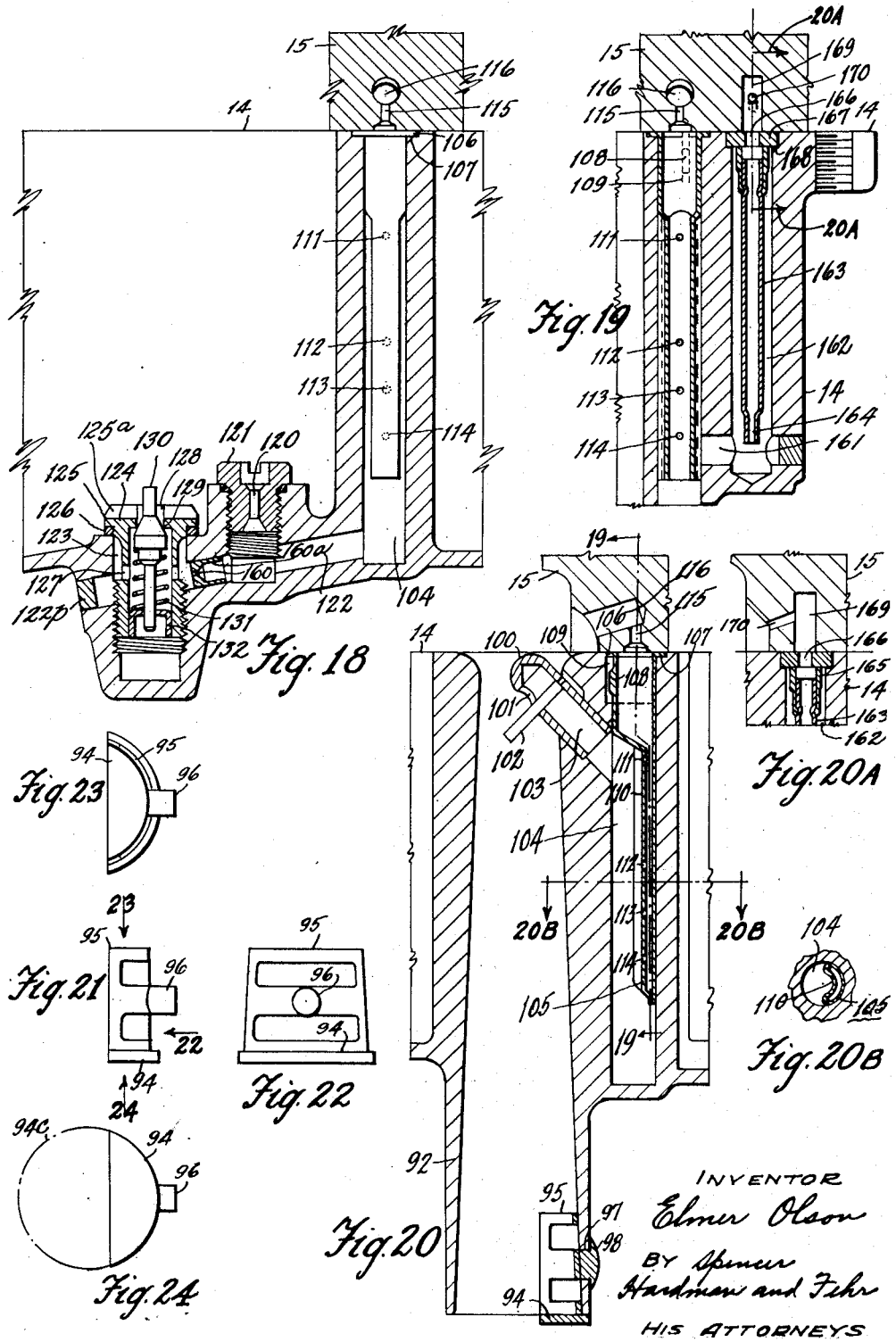
INVENTOR
Elmer Olson
BY Spencer
Hardman and Fehr
HIS ATTORNEYS

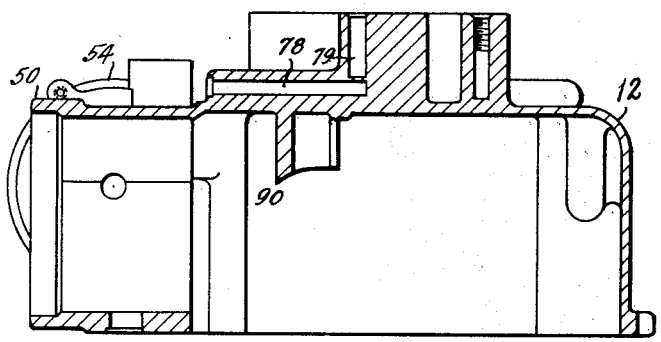
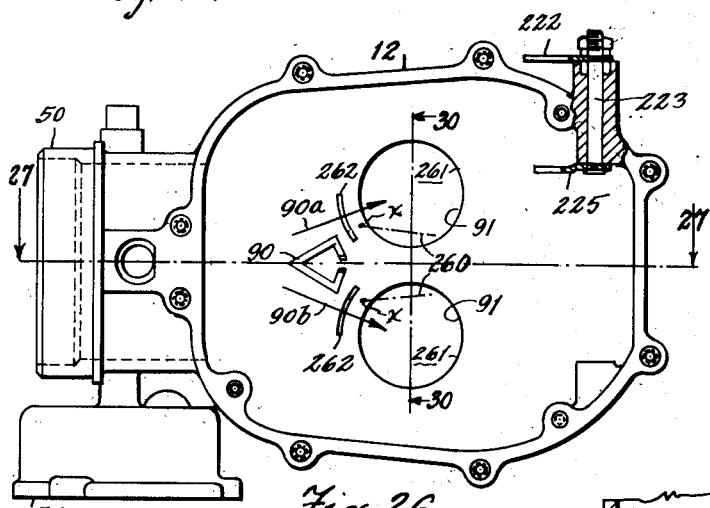
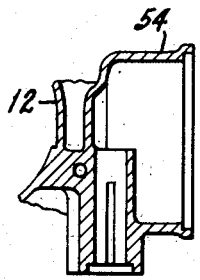
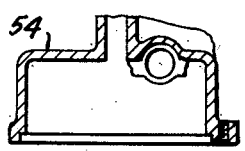
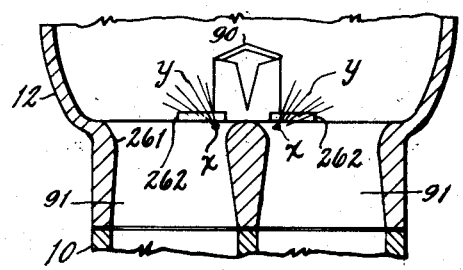
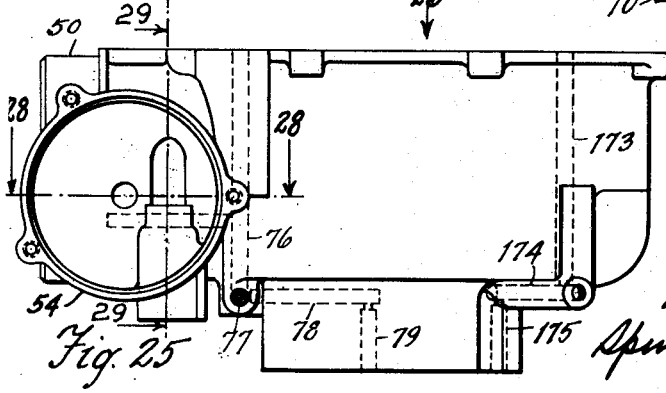

Oct. 28, 1952     E. OLSON     2,615,694
CARBURETOR

Filed Feb. 18, 1949     10 Sheets-Sheet 7

INVENTOR
Elmer Olson
BY
Spencer Hardman & Fehr
HIS ATTORNEYS

Oct. 28, 1952 — E. OLSON — 2,615,694
CARBURETOR
Filed Feb. 18, 1949 — 10 Sheets-Sheet 8
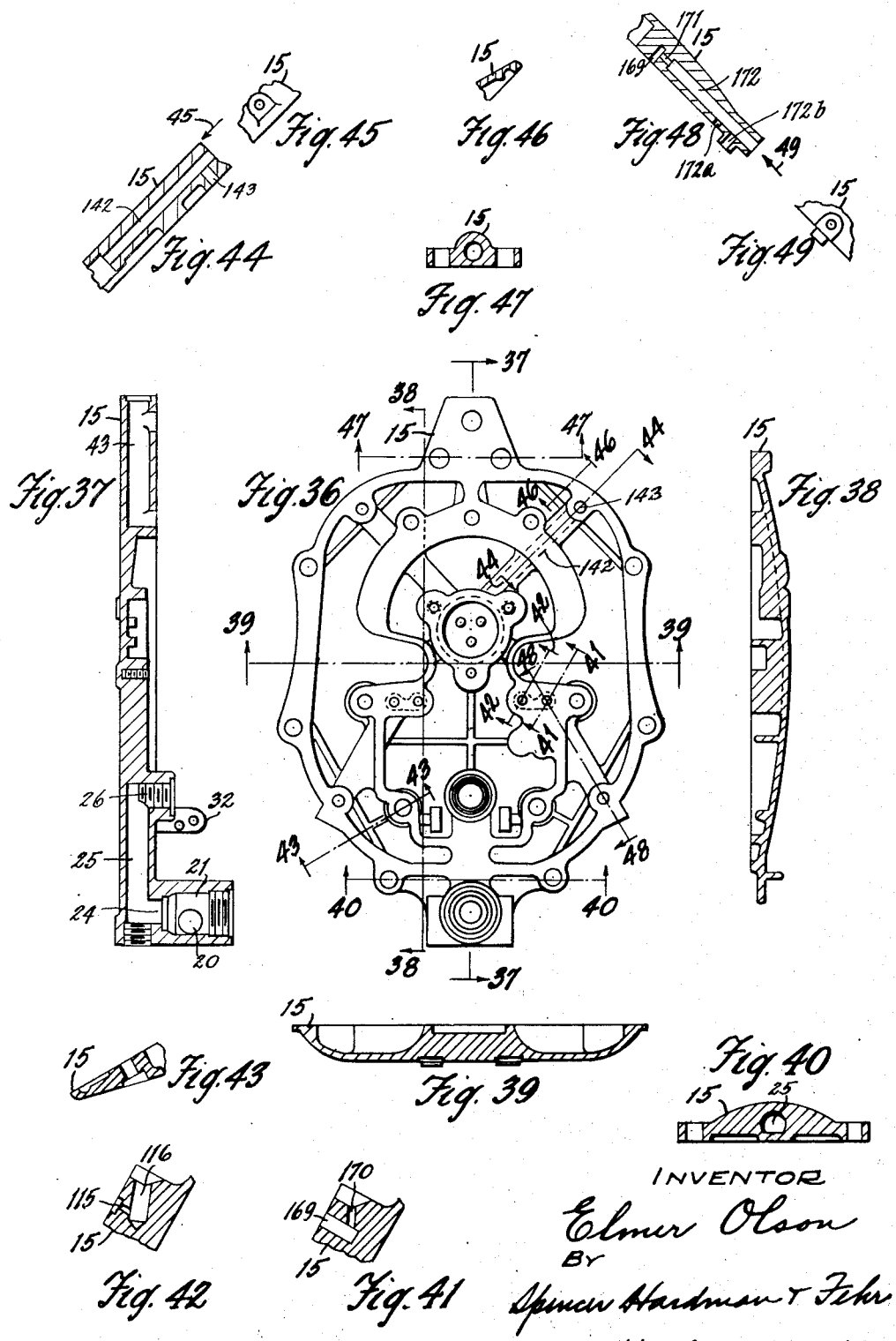

Oct. 28, 1952  E. OLSON  2,615,694
CARBURETOR
Filed Feb. 18, 1949  10 Sheets-Sheet 9

INVENTOR
Elmer Olson
BY Spencer Hardman & Fehr
HIS ATTORNEYS

Oct. 28, 1952 E. OLSON 2,615,694
CARBURETOR
Filed Feb. 18, 1949 10 Sheets-Sheet 10

INVENTOR
Elmer Olson
BY Spencer Hardman and Fehr
HIS ATTORNEYS

Patented Oct. 28, 1952

2,615,694

UNITED STATES PATENT OFFICE 2,615,694

CARBURETOR

Elmer Olson, Rochester, N. Y., assignor to General Motors Corporation, Detroit, Mich., a corporation of Delaware Application February 18, 1949, Serial No. 77,097

18 Claims. (Cl. 261—23)

This invention relates to charge forming devices and more particularly to carburetors for automotive engines.

Objects of this invention include the provision of a dual carburetor which is relatively short in stature and in which the accumulation of heat from the engine by the liquid fuel is substantially prevented. In the disclosed embodiment of this invention, these objects are accomplished by a construction which includes a fuel bowl, a bowl housing and cover for the bowl and housing supported by the housing and supporting the bowl with its side walls spaced from the bowl. Air which enters horizontally at one end of the housing and into the space between the bowl and housing serves to minimize bowl temperature. This air is divided by a deflector provided by the housing into two streams which respectively supply two primary venturis provided by the bowl and two secondary venturis provided by the housing, the axes of said venturis being in a vertical plane at right angles to the path of air entering the housing and to the axis of symmetry of the housing. Means supported by the bowl and operating in conjunction with passages provided by the cover and housing supply fuel for engine idling. Means supported by the bowl and operating in conjunction with means provided by the cover supply fuel to nozzles in the primary venturis for engine operation other than idling. During acceleration, a pump supported by the bowl and operated by means supported by the housing forces liquid fuel from nozzles which direct the liquid jets respectively against deflectors which effect more complete atomization of the liquid and direct it into the two air streams entering the secondary venturis.

Further objects and advantages of the present invention will be apparent from the following description, reference being had to the accompanying drawings, wherein a preferred embodiment of the present invention is clearly shown.

In the drawings:

Fig. 1 is a top view of the carburetor and a portion of the cover broken away.

Fig. 2 is a side view looking in the direction of arrow 2 of Fig. 1.

Fig. 2A is a fragmentary sectional view on line 2A—2A of Fig. 3. Fig. 2B is a sectional view on line 2B—2B of Fig. 6.

Fig. 3 is a bottom view looking in the direction of arrow 3 of Fig. 2.

Fig. 4 is a view of the side opposite to that shown in Fig. 2.

Figs. 5 and 6 are end views looking in the direction, respectively, of arrows 5 and 6 of Fig. 4.

Fig. 7 is a view on line 7—7 of Fig. 6.

Fig. 8 is a view similar to Fig. 7, certain parts being omitted and the part in section being on line 8—8 of Fig. 5.

Fig. 9 is a sectional view on line 9—9 of Fig. 4. Fig. 9A is a view in the direction of arrow 9A of Fig. 9, showing a fragment of the disc 59 and stud 58. Fig. 9B is a sectional view on line 9B—9B of Fig. 9A.

Fig. 10 is a sectional view on line 10—10 of Fig. 1.

Fig. 11 is a sectional view on line 11—11 of Fig. 1.

Fig. 11A is a view in the direction of arrow 11A of Fig. 11.

Fig. 11B is a plan view of lever 30.

Fig. 11C is a sectional view on line 11C—11C of Fig. 11.

Fig. 11D is a sectional view on line 11D—11D of Fig. 6.

Figure 12:
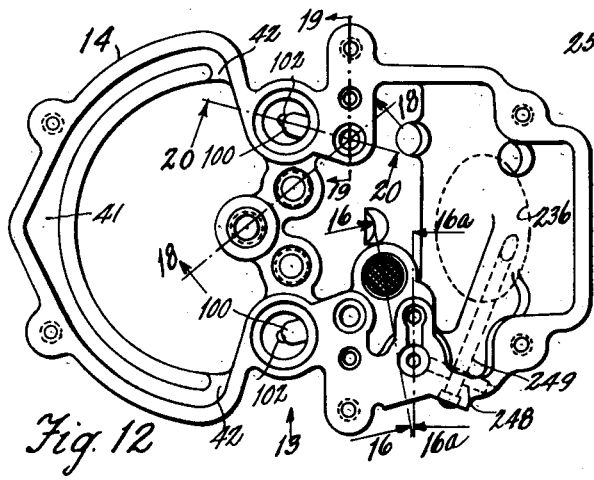

Fig. 12 is a plan view of the fuel bowl.

Figure 13:
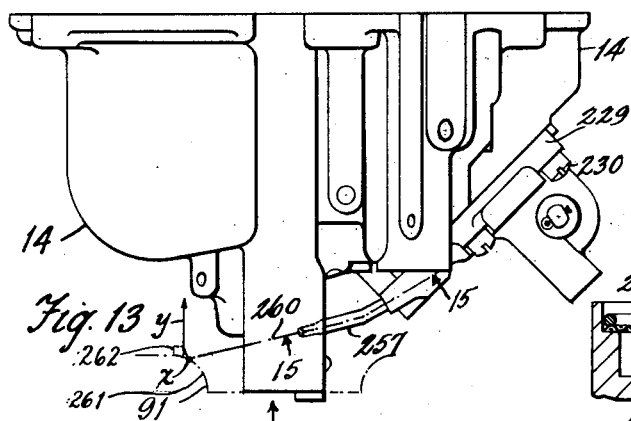

Fig. 13 is a side view looking in the direction of arrow 13 of Fig. 12.

Figure 14:
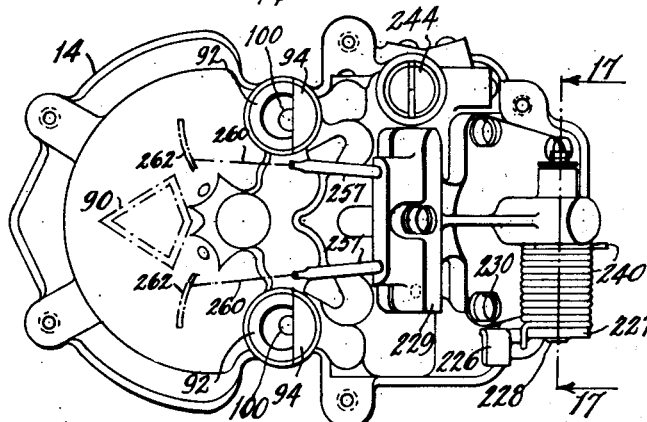

Fig. 14 is a bottom view looking in the direction of arrow 14 of Fig. 13.

Figure 15:
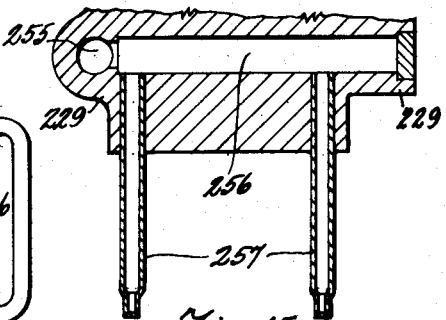

Fig. 15 is an enlarged sectional view on line 15—15 of Fig. 13.

Figure 16:
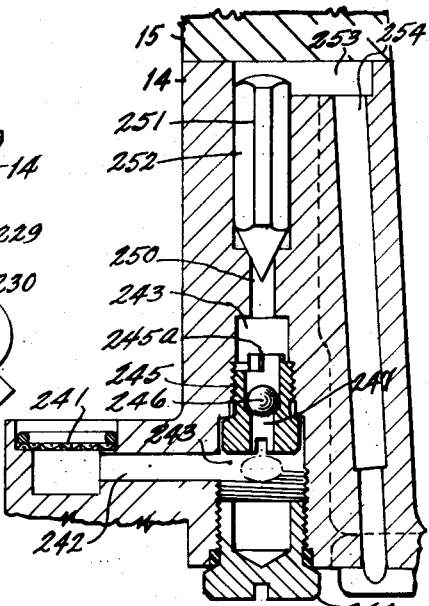

Fig. 16 is an enlarged sectional view on lines 16—16 and 16a—16a of Fig. 12.

Figure 17:
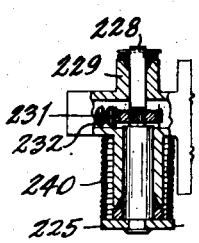

Fig. 17 is a sectional view on line 17—17 of Fig. 14.

Fig. 18 is an enlarged sectional view on line 18—18 of Fig. 12.

Fig. 19 is an enlarged sectional view on line 19—19 of Fig. 12.

Fig. 20 is an enlarged sectional view on line 20—20 of Fig. 12.

Fig. 20A is a sectional view on line 20A—20A of Fig. 19.

Fig. 20B is a sectional view on line 20B—20B of Fig. 20.

Fig. 21 is a side view of a deflector shown in section in Fig. 20.

Figs. 22, 23 and 24 are views looking respectively in the direction of arrows 22, 23 and 24 of Fig. 21.

Fig. 25 is a side view of the bowl housing as viewed in Fig. 4.

Fig. 26 is a top view of the bowl housing as viewed in the direction of arrow 26 of Fig. 25.

Fig. 27 is a sectional view on line 27—27 of Fig. 26.

Fig. 28 is a sectional view on line 28—28 of Fig. 25.

Fig. 29 is a sectional view on line 29—29 of Fig. 25.

Fig. 30 is a fragmentary sectional view on lines 30—30 of Figs. 1 and 26.

Figure 32:
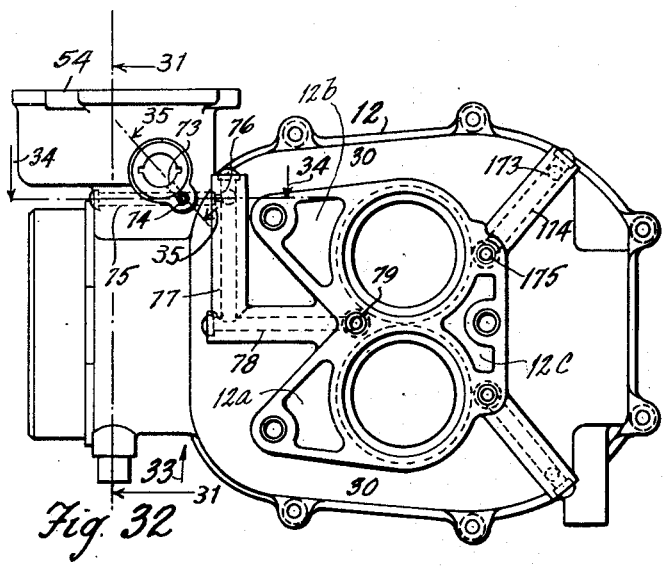
Figure 31:
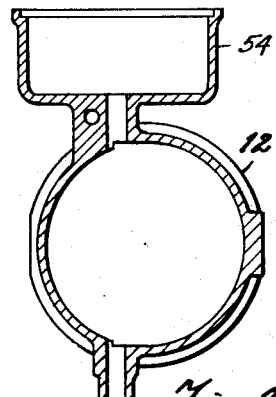

Fig. 31 is a sectional view on line 31—31 of Fig. 32.

Fig. 32 is a bottom view of the bowl housing.

Figure 33:
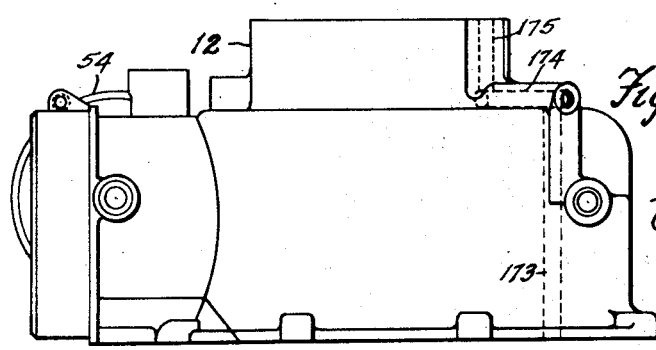

Fig. 33 is a view in the direction of arrow 33 of Fig. 32.

Figure 34:
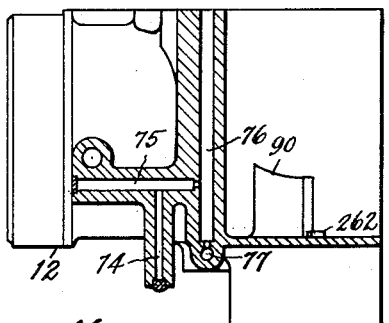
Figure 35:

Figs. 34 and 35 are sectional views on lines 34—34 and 35—35, respectively, of Fig. 32.

Fig. 36 is an underside view of the cover for the bowl and bowl housing.

Figs. 37, 38, 39, 40, 41, 42, 43, 44, 46, 47 and 48 are sectional views taken, respectively, on lines 37—37 38—38, 39—39, 40—40, 41—41, 42—42, 43—43, 44—44, 46—46, 47—47 and 48—48 of Fig. 36.

Fig. 45 is a view in the direction of arrow 45 of Fig. 44.

Fig. 49 is a view in the direction of arrow 49 of Fig. 48.

Figure 50:
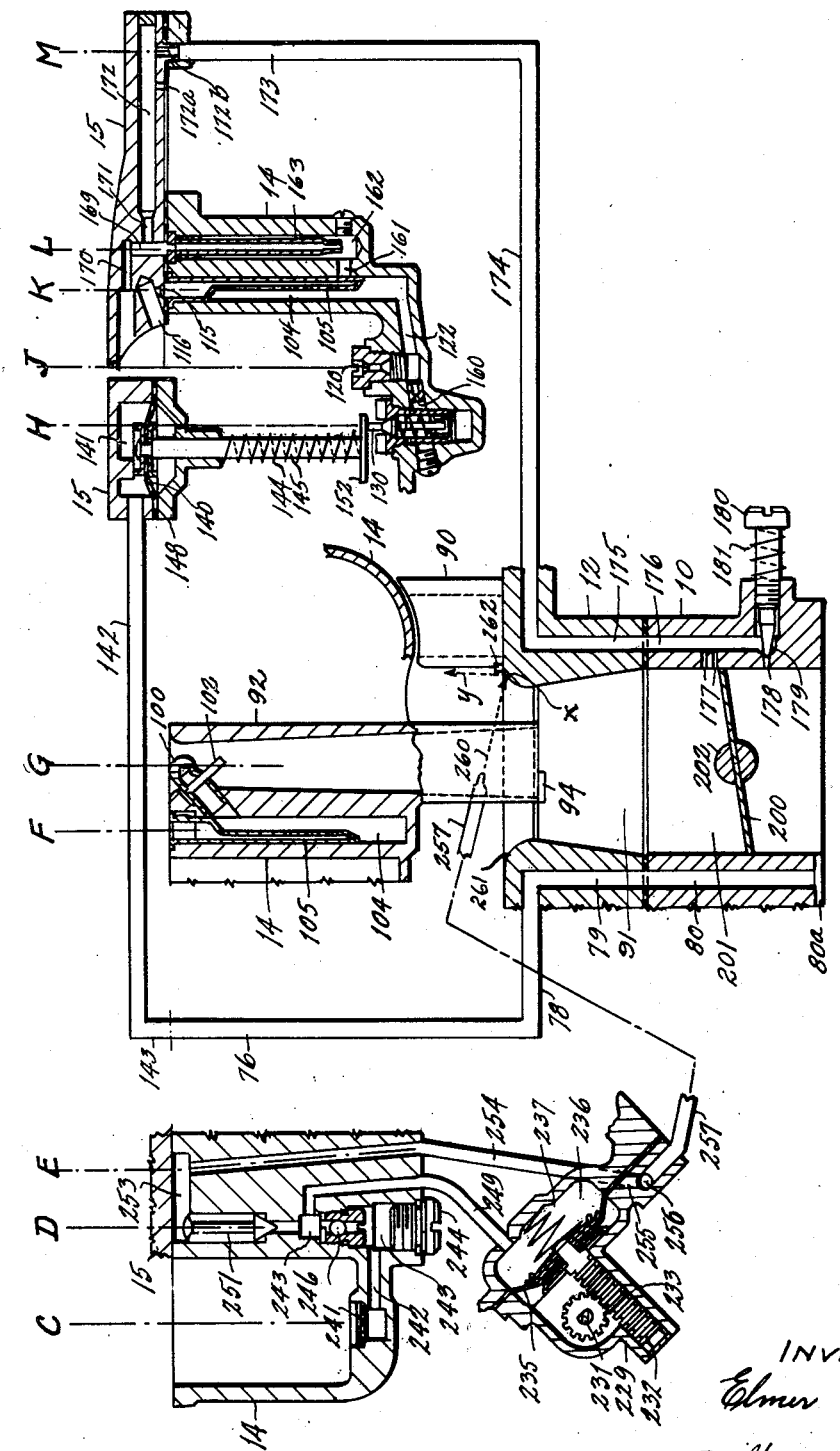

Fig. 50 is a diagram of the carburetor.

Figure 51:
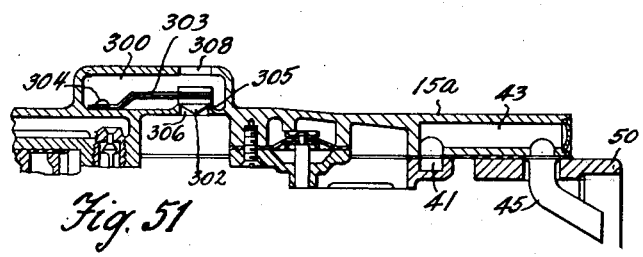
Figure 52:
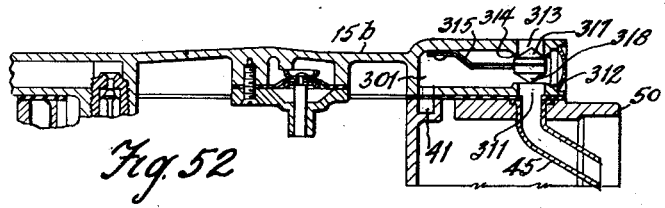
Figure 53:
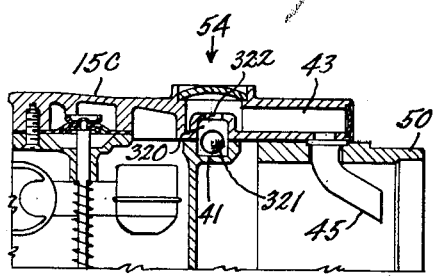

Figs. 51, 52 and 53 are sectional views showing portions of Fig. 11 with modifications.

Figure 54:
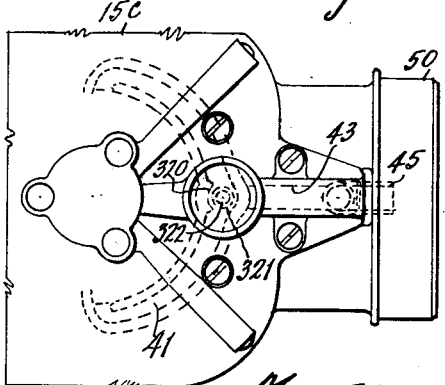

Fig. 54 is a view in the direction of arrow 54 of Fig. 53.

Figure 55:
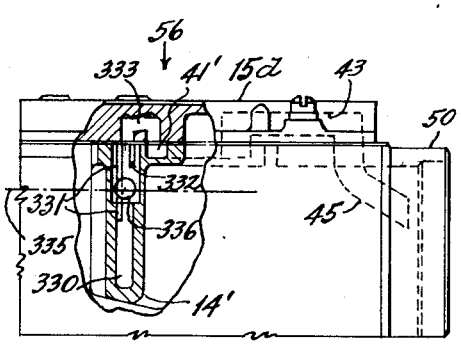

Fig. 55 is a sectional view showing portions of Fig. 11 with further modifications.

Figure 56:
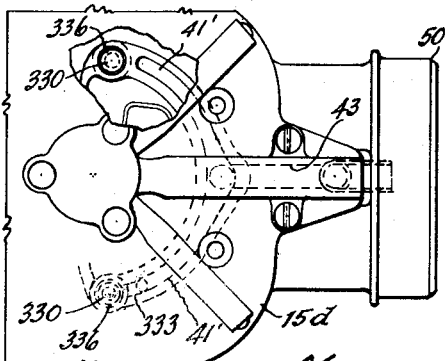

Fig. 56 is a view in the direction of arrow 56 of Fig. 55.

Referring to Figs. 1 to 3, the carburetor comprises a base 10 having holes 11 for receiving screws by which the carburetor is attached to the intake manifold of an engine. Base 10 forms a continuation of a housing 12 attached to the base by screws 13 (Fig. 2). Housing 12 encloses a fuel bowl 14 (Figs. 1 and 11) which is supported by a cover 15 which closes the openings in the upper sides of housing 12 and bowl 14. A gasket 16 seals the joint between housing 12, bowl 14 and cover 15. A tapped hole 20 (Fig. 4) receives the end of a pipe connected with the outlet of a gasoline fuel pump. Through hole 20 fuel enters a bore 21 (Fig. 11) closed by a plug 22 which supports a tubular filter screen 23. The fuel which passes the filter flows through vertical passage 24 and horizontal passage 25 (closed at one end by plug 26) to a valve seat member 27 screwed into the cover 15 and having hole 28 which may be closed by a float controlled valve 29 which gravitates against a lever 30 pivoted on a pin 31 supported by lugs 32 integral with cover 15. Lever 30 is connected with a float 33 connected by a yoke 34 with a float 35. An arm 36 of lever 30 engages a balance spring 37 whose ends are attached to U-clips 38 supported by lugs 32. A flange 40 of bowl 14 (Fig. 11) is provided with a channel 41 (Fig. 1) having its ends 42 communicating with the interior of the bowl. About midway thereof channel 40 is connected by passage 43 (Fig. 11) of cover 15 (closed by plug 44) and connected with a pipe 45 having a flange 46 by which this pipe is supported by the housing 12 and held in place with the cover 15. Pipe 45 is open at both ends and is located within the air inlet 50 which is connected in any suitable manner with an air cleaner. In this way the float bowl is vented.

The flow of air horizontally through the inlet 50 is under control by an unbalanced choke valve 51 whose fully open position 51' is shown by dot-dash lines. Flow of air to the left through the inlet 50 (Fig. 11) tends to open valve 51 but its opening is under control by an automatic choke controller. Valve 51 is attached to a shaft 52 journaled in bearings 52a, 52b provided by the housing 12 as shown in Fig. 9. Shaft 52 is attached tto a lever 53 located in a cup 54 provided by housing 12 and adapted to be engaged by the hook end 55 of a spiral, bi-metal thermostat 56 whose inner end 57 (Fig. 7) is connected with a central stud 58 provided by a disc 59 supported by flange 60 of cup 54 and retained therein by clips 61 attached by screws 62 to the cup. The disc 59 can be turned in order to vary the force which the thermostat 56 exerts, when cold, upon the lever 53. When located in the desired position of adjustment, the disc 59 is fixed by a clip 63 having teeth 64 which are received by spaces between teeth 65 at the periphery of the disc 59, said clip being secured in position by a screw 66 threaded into the cup 54. The amount of force which the thermostat 56 applies to lever 53 in cold weather is such as to bias the valve 51 to closed position. Action of the thermostat 56 to urge the valve 51 to closed position is opposed by means responsive to engine intake suction and comprising a piston 70 (Fig. 8) connected with lever 53 by a link 71 and movable in a cylinder 72 provided by cup 54, said cylinder being connected with the engine intake by passages provided by the carburetor, namely, passages 73, 74, 75, 76, 77, 78, 79 (Figs. 32, 34, 35). Passage 79 (Figs. 3 and 11) is aligned with a passage 80 in base 10 connected by groove 80a with fuel mixture passages 201 connected with the intake manifold when the carburetor is installed.

The disc 59 (Fig. 9) has a centrally located threaded nipple 81 adapted to be connected by a pipe (not shown) with a device for heating air from the heat of the engine. The nipple 81 is connected through passages 82a (between ribs 82 connecting stud 58 with disc 59) with the interior of cup 54, there being a baffle plate 83 supported by a disc 59 to prevent the flow of heated air directly to the thermostat 56. As piston 70 (Fig. 8) moves down under the action of the engine intake suction it uncovers grooves 84 which permit air sucked by the engine to pass around the piston 70 into the cylinder space below it and out through the passages 73–80 to the engine intake. As the temperature of the engine increases the thermostat 56 bends in such manner that the hook 55 (Fig. 7) moves clockwise, thereby relieving pressure on the lever 53 so that the choke valve is gradually opened as the engine temperature increases.

Air passes horizontally through the inlet 50 (Fig. 11) into the space between the bowl 14 and the housing 12. The air passing under the bowl 14 is split by a deflector 90 (Fig. 11 and 26) into two streams represented by arrows 90a and 90b which flow into the secondary venturis 91 provided by housing 12, as shown in Fig. 10. Venturis 91 are aligned with primary venturis 92 integral with bowl 14 and having air inlets which are placed in communication with the air spaces between the bowl 14 and the housing 12 by recesses 93 provided by cover 15 (Fig. 10).

Each venturi 92 is provided at its lower end (Fig. 20) with a deflector 94 in the shape of a segment of a circle 94c (Fig. 24) and integral with a bracket 95 having a rivet shank 96 (Figs. 21, 22) which is passed through a hole 97 in the venturi and riveted over at 98, thereby placing the deflector 94 part way across the lower end of the venturi 92.

The function of each deflector 94 is to cause an eddy current to occur beneath it which causes the fuel mixture in the secondary venturi 91 and in the outlet 201 to be more dense on the sides thereof closest to the deflector and less dense on the sides thereof more remote from the deflector. Referring to Fig. 50, the fuel mixture would be more dense on the left hand sides of the venturi 91 and passage 201 than on the right hand sides. This is desirable for certain engines in order to obtain more equal distribution of fuel mixture by the manifold. Obviously the deflector can be located in any desired position at the bottom of the venturi 92 by locating the hole 97 (Fig. 20) in the proper position.

Into each venturi there extends a fuel nozzle member 100 which is closed at its upper end and is provided with a side opening 101 through which extends a rod 102 attached to the nozzle. Opening 101 communicates with the passage 103 in member 100 connected with a main fuel well 104 into which there extends a tube 105 having a flange 106 received by counterbore 107 and having a key 108 received by a groove 109 whereby the tube 105 can be prevented from rotating and maintained in proper position relative to nozzle 100, as shown in Fig. 20. The lower portion 110 of the tube is deformed as shown in Fig. 20B and this portion has side holes 111, 112, 113 and 114 which are successively uncovered as the level of fuel in the well 104 drops. The upper end of well tube 105 is connected with the bowl by passages 115 and 116 (Figs. 18–20).

The main well 104 is a bore in bowl 14. It is closed at the top by well tube 110 which provides the series of air bleeds 111 to 114 which are successively uncovered as engine speed increases. Tube 110 is closed at its upper end by cover 15 which provides restriction 115 which meters bleed air to the passages 111–114. The provision of passages for air to the main nozzle 100 has been simplified by providing a well tube which can be separately fabricated and dropped into the well.

The function of rod 102 (Fig. 20) is to cause liquid fuel which begins, during transition from idling to running, to flow from passage 101, to flow along the rod 102 toward the middle of the venturi 92 and not down the side wall thereof which it would not be in a desirable location for forming a fuel mixture with the air passing down through the venturi.

Each of the two wells 104 receives fuel from the bowl 14 which passes through a main metering orifice 120 in a plug 121 and connected with a passage 122. Each of the two passages 122 is connected with a bore 123, threaded to receive a bushing 124 having a flange 125 which is screwed against a seal washer 126. Bushing 124 has side openings 127 connecting the bore 123 with a central opening 128 extending through a valve seat 129 normally engaged by a valve 130 urged upwardly by a spring 131 retained by a cup-shaped plug 132. In response to demand for increased engine power, valve 130 is caused to move down by means responsive to decrease in engine intake suction. This means includes a diaphragm 140 which closes a chamber 141 (Fig. 11) provided by cover 15 and connected by passages 142 and 143 (Figs. 36 and 44) with passage 76 (Fig. 34) and hence with the engine intake manifold. When under part load, the engine suction is high and the diaphragm 140 will be held up against the action of a spring 144 which surrounds a rod 145 connected with diaphragm 140 and with washers 146 and 147 between which the diaphragm is clamped. The edges of the diaphragm are secured to the cover 15 by a cover 148 which screws 149 attach to the cover 15. The cover 148 has a vent 150 and a guide sleeve 151 through which the rod extends. The lower end of the rod 145 carries a disc 152. The spring 144 is confined under compression between the disc 152 and the lower end of the guide 151. When the throttle valves are opened to demand more power, before the engine speed can increase there will be a decrease in engine suction whereupon the spring 144 will be effective to move the disc 152 downwardly and cause the same to engage the upper end of valve 130 (Figs. 11 and 18), thereby admitting a greater proportion of liquid fuel to the fuel mixture. The cross slots 125a (Fig. 18) in bushing 124 provide fuel passages particularly when disc 152 is close to the bushing flange 125. Fuel passing from recess 123 is metered by orifice 160 in bushing 160a pressed into passage 122 before it is closed by plug 122p.

Each well 104 (Fig. 19) is connected by hole 161 with an idle well 162 provided by bowl 14. Each well 162 receives an idle well tube 163 having a restricted opening 164 at its lower end and attached at its upper end to a cap 165 having a central opening 166 and a flange 167 received by a counterbore 168 in the bowl. As shown in Figs. 19 and 20A, each well tube 163 is connected with the fuel bowl by passages 169 and an idle air bleed passage 170; and each passage 169 is connected through a metering orifice 171 (Fig. 48) with a passage 172 connected with a second idle air bleed passage 172a and with a passage 172b connected with passages 173, 174 and 175 in housing 12 (Fig. 33). As shown in Figs. 2A and 50, passage 175 is connected with passage 176 in base 10. Passage 176 is connected by two passages 177 anterior to the throttle valve 200 when closed and by single passage 178 posterior thereto. Passage 178 is controlled by needle valve 179 on the end of a screw 180 threaded in the base 10 and retained in desired position of adjustment by spring 181 confined under compression between base 10 and the head of the screw.

It will be understood that each primary venturi is connected as described with a main well and an idle well and that each idle well is connected as described with a fuel mixture passage 201 which is provided by a base 10 as shown in Fig. 10. Each passage 201 receives a throttle valve 200 mounted on a shaft 202 supported by the base.

Referring to Fig. 2, shaft 202 is connected with a lever 203 having an opening 204 for making connections with a link connected with the accelerator pedal which is spring actuated into normal position in which the throttle valve will be nearly closed or in engine idling position. The accelerator pedal restoring spring (not shown) urges lever 203 (Fig. 2) counterclockwise until a stop screw 205 engages a lug 206 of the base 10 or a stop screw 207 engages a cam surface 208 having parts such as 208a, 208b and 208c at different distances from the center of rotation of a lever 210 which provides the surface 208. These stop screws are threaded into lever 203 and each held in adjusted position by a spring 209. The lever 210 is pivoted on a screw 211 threaded into base 10. A link 212 connects lever 210 with a plate 213 at 214. Plate 213 (Fig. 9) attached to a hub 215 is loosely journaled on housing 12 and has a tail 216 which engages a lug 217 of a lever 218 connected with choke shaft 52 and retained by screw 219. Plate 213 tends to gravitate counterclockwise (Fig. 2) and urges link 212 to the left and lever 210 counterclockwise, said movement from position shown in Fig. 2 being prevented, when the choke valve 51 is closed, by the engagement of lug 217 with tail 216 of plate 213. Lever 203 has a lug 220 for engaging lever 210. At normal engine operating temperatures, the idle position of throttle valves 200 is determined by the engagement of stop screw 205 with lug 206. When starting a cold engine it is desirable to have a relatively fast engine idling speed. The choke valve 51 being closed by thermostat 56, lever 210 is located as shown in Fig. 2 with the highest part 208a of cam surface 208 engaged by stop screw 207. Part 208a is wide enough to be engaged by screw 207 although, after starting the engine, engine suction opens the choke a short distance. As engine temperature increases, the choke valve automatically opens; and, since lug 217 is moved counterclockwise, plate 213 is released to move lever 210 counterclockwise to bring cam parts 208b and 208c of lesser radius into alignment with screw 207 so that the throttle valves will return to slower engine idling positions when the accelerator pedal is released.

In order to provide for de-choking or clearing out the carburetor by a full open movement of the throttle valves 200 while the engine is still cold or warming up and the choke valve 51 is still closed or nearly closed, the lever 203 is provided with a lug 220 which engages lever 210. As the lever 203 is moved clockwise to fully open the throttles 200, lever 210 and plate 213 and lever 218 are caused to move counterclockwise and the choke valve 51 is fully opened.

Lever 203 (Fig. 2) is connected by a link 221 with a lever 222 which is attached to a shaft 223 (Fig. 6) journaled in a bearing provided by housing 12. Link 221 has a hook end adapted to be received by either one of three holes 224 of lever 222 so that the amount of movement imparted by lever 203 to lever 222 can be changed.

Lever 223 is connected with a lever 225 (Fig. 6) adapted to engage the lug 226 (Fig. 11D) of a lever 227 which, as shown in Figs. 14 and 17, is attached to a shaft 228 journaled in bearings provided by a pump housing 229 which screws 230 attach to bowl 14. Shaft 228 is connected with a pinion 231 which, as shown in Fig. 11, engages a cylindrical rack 232 provided by a rod 233 which passes through washers 234a, 234b, 234c, 234d and a diaphragm 235 and is riveted over so that the diaphragm is clamped between the washers. The edge of diaphragm 235 provides a gasket between housing 229 and bowl 14, the space between the diaphragm and the bowl providing a fluid receiving chamber 236. A spring 237 urges the diaphragm into the position more remote from the bowl 14 as shown in Fig. 11. Washer 234a stops against housing 229 to limit expansion of spring 237 and washer 234d serves as a spring seat.

A torsion spring 240 (Figs. 14 and 17), surrounding a portion of housing 229 and bearing at one end against the housing and, at the other end against the lever 225, urges this lever in a direction (counterclockwise in Fig. 11D) to cause pinion 231 to rotate counterclockwise (Fig. 11) and force the diaphragm 235 toward the bowl 14 to cause fuel to be expelled from the chamber 236. Action of spring 240 for this purpose is prevented by virtue of engagement of lug 226 of lever 227 with arm 225a of lever 225 which is held in the position shown in Fig. 11D by virtue of its connection with throttle lever 203 which the accelerator pedal return spring normally urges to throttle closing position, said accelerator return spring being stronger than spring 240. Spring 240 is in fully stressed condition when lever 227 is in fully cocked position (Fig. 11D) corresponding to fully closed position of the throttle valves. Opening of the throttle valves releases spring 240 for action to force liquid from the chamber 236 and out through nozzles 257 (Fig. 14) through passages to be described. When the throttles are opened suddenly, the arm 225b of lever 225 (Fig. 11D) engages lug 226 of lever 227 and moves it a short distance counterclockwise with greater rapidity than spring 240 alone could move it. Therefore spring 240 is assisted momentarily by direct mechanical action to effect initially a rapid squirting of fuel from the nozzles 237 so that the effect of rapid full opening of the throttle valves is to inject fuel rapidly at first and then more slowly as the spring 240 operates alone. The initial rapid squirt is desirable to initiate acceleration and the slower squirt to complete it without overriching the fuel mixture.

When the diaphragm moves down liquid fuel flows from the bowl through a filter screen 241 (Fig. 16), passage 242 in bowl 14 into a threaded bore 243 closed at its bottom by a plug 244 and receiving a valve seat bushing 245 supporting a ball check valve 246 retained by a rib 245a deformed from the bushing. Downward movement of the diaphragm causes a partial vacuum which must be filled by liquid fuel. Therefore, the fuel flows upwardly through the hole 247 in bushing 245 past the check valve 246 and into the upper part of recess 243 and thence through connecting passages 248 and 249 (Fig. 12) of bowl 14 and into the chamber 236. When the driver presses down on the accelerator pedal to increase speed, the diaphragm is caused to move up to squeeze out the fuel in the chamber which flows back to the upper end of bore 243, thereby closing the check valve 246 and then flowing upwardly through the passage 250 and lifting the relatively heavy check valve 251 and flowing along the flats 252 thereof to a cross passage 253 and down through passage 254 which, when pump housing 229 is assembled with bowl 14, communicates with a passage 255 in housing 229 as shown in Fig. 15. Passage 255 is connected with a manifold passage 256 connected with nozzles 257. Therefore, fuel is squirted from the nozzles in direction represented by dot-dash lines 260 in Figs. 13 and 14.

The fuel jets are aimed at rounded surface 261 at the entrances of the secondary venturis (Fig. 13). These surfaces direct the jets toward deflectors 262 (see also Figs. 13, 26 and 30). In Fig. 30, the dots $x$ represent the targets of the jets upon the surfaces 261 and the lines $y$ represent the fanning-out of the jets due to impingement upon the deflectors. Thus the fuel is spread out in a fan-like pattern in the paths of air currents represented by arrows 90a, 90b in Fig. 26. In this way the liquid fuel injected for acceleration is caused to mix rapidly with air so that smooth acceleration is provided.

One of the passages 201 (Fig. 2B) is connected by passages 270 and 271 with a tapped hole 272 in base 10 for making connection with a pipe connected with the engine suction controller of an ignition timer having means for controlling spark timing in response to engine load conditions.

Base 10 (Fig. 11) has a tapped hole 280 connected by passages 281 (Fig. 3) with passages 201.

Hole 280 is connected by a pipe with the windshield wiper.

In Fig. 50, which is a diagram of the carburetor except as to the choke control, certain parts are associated with vertical dot-dash lines marked with letters C to L, respectively. The location of these parts in Fig. 1 can be found easily by reference to ends of lead lines marked C to L, respectively. For example, in Fig. 50, the main fuel wells are associated with lines F and K. In Fig. 1, the ends of lead lines leading from F and K indicate, respectively, the location of parts associated in Fig. 50 with vertical lines F and K.

The primary venturis 92 (Fig. 10) provide part of the wall of the fuel bowl 14. During engine operation the refrigerating effect of vaporization of fuel in the primary venturis cools the bowl so that its temperature is less than that of the incoming air. It has been found that, when the engine stops, there is a drop in bowl temperature, due to the lower temperature of the venturis 92 at the time the engine stopped, before temperature rises to environment temperature. The transfer of heat from the engine to the fuel bowl is practically negligible because the bowl is supported by the cover and the side and bottom walls of the bowl are exposed to air currents. The gaskets between the cover and bowl housing and between the cover and bowl and between the bowl and the base retard passage of heat. The areas of the surfaces in contact with these gaskets are relatively small so as to retard conduction of heat. Even the bottom of the housing 12 is cored out at 12a, 12b, 12c (Fig. 32) to restrict the area of contact between the housing 12 and the gasket 12d (Fig. 11). These factors contribute to prevention of such accumulation of fuel vapor in the bowls as would cause vapor lock.

If the carburetor is used in climates where the incoming air temperature is continually high, it may be desirable to use additional means to prevent accumulation of fuel vapor in the fuel bowl by providing for the escape thereof to the surrounding atmosphere.

Fig. 51 shows a modified form of cover 15a which has a housing 300. Housing 300 encloses a valve 302 carried by a bimetal blade 303 attached to the cover 15a at 304. Normally valve 302 engages a seat 305 surrounding a hole 306. When carburetor temperature becomes abnormally high, blade 303 bends upwardly to open vent 306 so that fuel vapor can escape through hole 308 in cover 15a. Obviously some fuel vapor can escape through vent 45 to the air inlet 50 before and after valve 302 rises.

If it is not desirable to allow an excessive amount of fuel vapor to pass to the air inlet 50, the form shown in Fig. 52 can be used. Cover 15b has a housing 301 for connecting groove 41 either with a hole 311 through a valve seat 312 or with a hole 313 through a valve seat 314. Housing 301 encloses a bimetal blade 315 fixed at 316 and carrying a valve 317 which normally engages seat 314 and a valve 318 which is normally separated from seat 312. When a certain abnormal carburetor temperature is reached, blade 315 bends down to close hole 311 and to open hole 313 so that fuel vapor escapes only to the outside and not to the air inlet 50.

In the event that the float valve 29 (Fig. 11) failed to block the flow of fuel into the bowl due, for example, to engagement with a particle of foreign matter upon the valve seat, the fuel pump would continue to fill the bowl to overflowing and fuel would pass through channel 41 and vent pipe 45 to the air inlet. Excess fuel would choke the engine if the car were moving on the level, down grade or a moderate up-grade. If the car were moving on a steep up-grade, the fuel would run back into an air filter attached to the inlet 50 when it would become a fire hazard. To avoid such possibilities, the bowl channel 41 and the cover 15c provide a cage 320 (Figs. 53 and 54) for a cork ball 321 which, on being lifted by the excess fuel, closes a hole 322 and thus blocks escape of fuel to the vent pipe 45. The vent of the fuel bowl being blocked, the carburetor will soon cease to function and the engine will stop.

In the modifications shown in Figs. 55 and 56, the fuel bowl 14 provides wells 330, one near each end of channel 41' which is closed at its ends. Each well 330 is connected with the bowl by slots 331 and 332 and with the channel 41' by passage 333 in the cover 14d. The normal fuel level in the bowl and wells 330 is indicated by line 335. When the fuel level becomes excessive, cork balls 336 in the wells 330 are lifted to position engaging the cover and blocking the passages 333 and preventing escape of excess fuel to the vent pipe 45.

The carburetor disclosed herein is particularly adapted for mounting upon a V-type engine so that the center line of the carburetor, represented by line 11—11 of Fig. 1 will be in the vertical plane of the center line of the car. The float unit which extends between the venturis 92 is on the longitudinal center line of the carburetor and car and is in the best position to determine fuel level above the main and power orifices. The float unit includes the two floats 33 and 35 joined by a yoke 34 through which the power control rod 145 (Fig. 11) extends. In this way, both the float unit and the rod 145 can be on the longitudinal center line of the carburetor. It is desirable that the rod 145 be thus located so as to be in close proximity to the power control valve 130 which is on the center line of the bowl. The main orifices 120 and the power orifices 160 (Fig. 18) being near the center line of the bowl and the power valve 130 (Fig. 11) on the center line of the bowl, there is but slight variation in the pressure head of fuel above these orifices although the car may tilt traversely or longitudinally.

The main wells 104 are also near the center of the bowl so that tilting of the car has no appreciable effect on operation of the carburetor.

All mechanically articulated parts are carried by the housing 12 or the base 10 except as to levers 225 and 227 (Fig. 6). Although the pump is a part of the bowl and cover assembly, said assembly can be removed from the housing without requiring the unfastening of a motion transmitting device between the lever 222 (Fig. 2) and the pump shaft 228. One merely removes the screws which attach the cover to the housing and pulls the cover from the housing. In so doing, the lug 226 of lever 227 (Figs. 6 and 11D) pulls lever 225 counterclockwise (Fig. 11) and lever 227 is free of lever 225. When placing the cover and bowl assembly upon the housing, the throttle lever 203 is first moved to full-open-throttle position so that lug 226 of lever 227 can be received between the arms of lever 225.

While the embodiment of the present invention as herein disclosed, constitutes a preferred form, it is to be understood that other forms might be adopted.

What is claimed is as follows:

1. A down-draft dual-carburetor comprising a fuel bowl, a housing enclosing the bowl and providing a horizontal air inlet passage at one end thereof, a cover closing an opening in the top wall of the housing and covering and supporting the bowl with its side and bottom walls spaced from the adjacent walls of the housing, said housing, bowl and cover being symmetrical with respect to a horizontal axis on which the air inlet is located, two closely spaced passages through the bottom wall of the housing and located on a center line at right angles to said axis of symmetry, two vertical venturis provided by the bowl in alignment with the said passages and providing portions of side walls of the bowl which are recessed inwardly toward said axis, said bowl having a recess in its bottom wall and located on the axis and close to the center of the bowl and between the venturis, a power fuel valve unit including a valve seat member received by said recess and having an inlet passage for connection with the bowl and an outlet passage connected with said recess and including a valve member normally closing said inlet passage, main wells located respectively adjacent the venturis, branch passages in the bowl, each connecting the recess with a main well, power fuel-metering members in said passages, main fuel-metering members connecting the bowl with said passages between the power fuel-metering members and the main wells, nozzles connecting the main wells with the venturis, means supported by the cover and operating in response to decrease in engine suction for opening the power valve, means supported by the cover for conducting fuel to the bowl and for maintaining a certain level of fuel therein, passages for connecting the bowl space above the fuel level with the air inlet, passages for connecting said space with the main wells, throttle valves in said housing passages and controlling said passages, idle wells connected with the main wells, passages connected with the bowl space and connecting the idle wells with the housing passages and means operating in response to throttle opening movement for injecting fuel into air streams passing to the housing passages.

2. A carburetor according to claim 1 in which the means supported by the cover for conducting fuel to the bowl and for maintaining a certain level of fuel therein includes a valve and a float unit for controlling it, said float unit including a lever supported by the cover, a float member directly connected with the lever and located between the main wells and venturis, a yoke member attached to said float member and a second float member attached to the yoke, said yoke providing for extension therethrough of a portion of the means for controlling the power fuel valve, the parts of the float unit being symmetrically disposed relative to the axis of symmetry.

3. A carburetor according to claim 1 in which there is a wedge-shaped wall extending upwardly from the bottom wall of the housing and into close proximity to the bowl, said wall splitting air passing from the inlet under the bowl into two streams which flow into the housing passages, in which the fuel injecting means includes two nozzles which extend between the venturis and direct jets of fuel against curved surfaces defining the entrances of the base passages from whence the jets are deflected into the air streams.

4. In a down-draft carburetor, the combination of a vertical venturi, means for directing air to the top thereof, a fuel well, means for supplying fuel to the well, means for admitting air thereto, a nozzle communicating with the well and discharging fuel into the venturi, said nozzle being an inclined tube closed at its upper end and having a side opening close to the axis of the venturi, an inclined rod supported by the tube and extending downwardly across the interior of the tube and through the lower portion of the side opening and into the venturi passage, said rod terminating within said venturi at a point adjacent the axis thereof and providing a surface upon which fuel can flow rather than down the side wall of the venturi.

5. In a down-draft carburetor, the combination of a venturi, an intake passage into which the lower end of the venturi extends and having a space around the venturi tube, means for supplying fuel to the venturi, means for directing air to the entrance of the venturi, and a plate attached to the lower end of the venturi and extending part way across its exit in order to cause the formation of an eddy current underneath the plate whereby fuel mixture in the intake passage will be denser adjacent the side wall portion thereof closer to the plate than adjacent the side wall portion more remote from the plate.

6. In a carburetor, the combination comprising a fuel bowl, a housing enclosing the bowl, a cover supported by the housing and supporting the bowl, a venturi provided by the bowl, an intake passage provided by the housing, means supplying fuel to the venturi, means for directing air to the venturi, a throttle valve, a lever for moving it, and means for injecting fuel into the air flowing in the intake passage, said means including a pump supported by the fuel bowl and having a movable displacement member, a spring and a mechanism operated thereby for moving said member in the direction to inject fuel, a second lever connected with said mechanism and means for holding the lever in a spring cocking position preparatory to injection movement of the displacement member, said means including a third lever supported by the housing and connected with the throttle lever and having an arm engaging the second lever to hold it in spring cocking position when the throttle lever is being held in throttle closing position by the accelerator pedal return spring, said throttle lever being connected with the pedal when the carburetor is installed, said third lever having a second arm engageable with the second lever upon sudden throttle opening movement of the throttle lever, movement of the throttle valve to full open position so locating the third lever, that the bowl can be moved relative to the housing without interference between the third and second levers.

7. In a carburetor, the combination of a venturi, means for supplying fuel to the venturi, an air intake passage including a substantially flat wall adjacent the outlet of the venturi and a duct in alignment with the venturi, the mouth of said duct being defined by a convexly curved wall, means for injecting fuel into air passing toward said duct including a nozzle which directs a jet of fuel obliquely upon a portion of said curved wall close to said flat wall whereby the jet begins to spread and a rib extending from said flat wall for intercepting the jet and deflecting it more nearly at right angles to said flat wall whereby the air flowing therealong is intercepted by a fanlike sheet of fuel spray.

8. In a carburetor, the combination of a fuel bowl, a vertical venturi integral therewith, a well provided by a bore parallel to the venturi and closed at the bottom and open at the top, a nozzle extending into the venturi and connected with the well through a side passage, a well-tube closing the upper end of the well and having its portion which extends below said side passage to the nozzle of kidney-like cross sectional shape defined by spaced walls which are respectively, outwardly convex and concave, the convex wall being located against the well wall and the concave wall facing toward the side passage to the nozzle, said concave wall having a series of air-bleed holes vertically arranged, means provided by the bowl and well-tube to retain the latter in the position described, and a cover for the bowl for retaining the well-tube in the well and providing an air metering passage from the bowl to the tube.

9. In a carburetor, idling fuel supply means comprising a fuel bowl, an idle well provided by a vertical bore in a side wall of the bowl, a passage in the bowl for conducting fuel from the bowl to the well, a flanged tubular cap for closing the upper end of the well, a tube supported by and extending below the cap in the well, said tube being of substantially smaller outside diameter than the inside diameter of the well and providing a flow restricting passage at its lower end, said cap having a passage through it, a bowl cover which retains the cap upon the bowl, an idle fuel-mixture passage provided by the cover and connected with the well through the cap and well-tube and having air-bleed connection with the bowl, and other passages provided by the carburetor for connecting the idle fuel-mixture passage with the engine intake manifold.

10. In a carburetor, the combination comprising a fuel bowl, a cover therefor, a housing supporting the bowl and cover and having an air inlet duct for making connection with an air cleaner, a vent passage provided by the cover for connecting the bowl with the air inlet of the housing, a second vent provided by the cover for connecting the bowl directly with atmosphere, a valve for controlling the second vent, and a bimetal blade attached to the cover and carrying the valve and normally biasing the valve to close the second vent and operating at a predetermined high temperature to open the valve to permit escape of fuel vapor directly to atmosphere.

11. In a carburetor, the combination set forth in claim 10 further characterized by the provision of a second valve carried by the blade, a valve seat engageable by the second valve and included in a portion of the vent passage connecting the bowl with the air inlet of the housing, said blade holding the second valve in open position when holding the first valve in closed position and operating to move the second valve toward closed position when opening the first valve.

12. In a carburetor, the combination comprising a fuel bowl, a cover therefor, a housing supporting the bowl and cover and having an air inlet duct for making connection with an air cleaner, a fuel inlet to the bowl provided by the cover, a float controlled valve controlling said inlet, vent ducts provided by the bowl and cover for connecting the bowl with the air inlet, and means for preventing flow of fuel from the bowl through said vent ducts to the air inlet in case the float valve fails to close properly and the bowl is filled to overflowing and comprising a second float valve housed in a portion of a vent duct provided by the bowl and a valve seat against which the float valve is raised by excess of fuel, said valve seat being included in one of the vent ducts.

13. In a carburetor, the combination comprising a fuel bowl, a cover therefor, a housing supporting the bowl and cover and having an air inlet duct for making connection with an air cleaner, a fuel inlet to the bowl provided by the cover, a float controlled valve controlling said inlet, vent ducts provided by the bowl and cover for connecting the bowl with the air inlet, and means for preventing flow of fuel from the bowl through said vent ducts to the air inlet in case the float valve fails to close properly and the bowl is filled to overflowing and comprising a well provided by the bowl and connected with the fuel space therein, a second float valve in said well and supported by the fuel therein, a valve seat provided by the cover against which the second float is raised by excess fuel, said vent ducts provided by the bowl and cover including passages through the upper end of the well and through the seat in the cover for the second valve.

14. A downdraft dual carburetor comprising a constant level float chamber, a housing enclosing the float chamber and spaced therefrom to provide for the passage of air around said chamber, said housing having a horizontal air inlet passage at one end, and two parallel mixture outlet passages in the bottom of said housing below the float chamber, a shaft extending through both said mixture outlet passages at a right angle to the axis of the air inlet passage and having two throttle valves thereon for controlling the flow of combustible mixture from the carburetor, two vertical primary Venturi tubes supported by the float chamber so that they communicate with the air passage at their upper ends and with the mixture outlet passages at their lower ends, secondary Venturi tubes formed in the mixture outlet passages into which the primary Venturi tubes project along the axis thereof, a plurality of main fuel wells one of which is associated with each of the primary venturis, a fuel nozzle connecting each of the wells with its associated primary Venturi tube, a single valve controlled fuel passage for supplying fuel from the float chamber to both of said main wells, a plurality of additional fuel passages for supplying fuel from the float chamber to said wells, one of which is associated with each of said wells, means for supplying air to each of said wells above the fuel level therein and a plurality of idling fuel wells, one of which is connected with each of said main wells so as to receive fuel therefrom.

15. A downdraft dual carburetor comprising a constant level float chamber, a housing enclosing the float chamber and spaced therefrom to provide for the passage of air around said chamber, said housing having a horizontal air inlet passage at one end, and two parallel mixture outlet passages in the bottom of said housing below the float chamber, a shaft extending through both said mixture outlet passages at a right angle to the axis of the air inlet passage and having two throttle valves thereon for controlling the flow of combustible mixture from the carburetor, two vertical primary Venturi tubes supported by the float chamber so that they communicate with the air passage at their upper ends and with the mixture outlet passages at their lower ends, secondary Venturi tubes formed in the mixture outlet passages into which the primary Venturi tubes project along the axis thereof, a plurality of main fuel wells one of which is associated with each of the primary venturis, a fuel nozzle connecting each of the wells with its associated primary Venturi tube, a single valve controlled fuel passage for supplying fuel from the float chamber to both of said main wells, said valve controlled fuel passage having a suction operated valve therein which is operable upon a decrease in manifold suction to increase the size of the fuel passage and vice versa, a plurality of additional fuel passages for supplying fuel from the float chamber to said wells one of which is associated with each of said wells, means for supplying air to each of said wells above the fuel level therein and a plurality of idling fuel wells, one of which is connected with each of said main wells so as to receive fuel therefrom.

16. A downdraft dual carburetor comprising a constant level float chamber, a housing enclosing the float chamber and spaced therefrom to provide for the passage of air around said chamber, said housing having a horizontal air inlet passage at one end, and two parallel mixture outlet passages in the bottom of said housing below the float chamber, a shaft extending through both said mixture outlet passages at a right angle to the axis of the air inlet passage and having two throttle valves thereon for controlling the flow of combustible mixture from the carburetor, two vertical primary Venturi tubes supported by the float chamber so that they communicate with the air passage at their upper ends and with the mixture outlet passages at their lower ends, secondary Venturi tubes formed in the mixture outlet passages into which the primary Venturi tubes project along the axis thereof, a plurality of main fuel wells one of which is associated with each of the primary venturis, a fuel nozzle connecting each of the wells with its associated primary Venturi tube, a single valve controlled fuel passage for supplying fuel from the float chamber to both of said main wells, a plurality of additional fuel passages of fixed area for supplying fuel from the float chamber to said wells, one of which is associated with each of said wells, a valve operable in response to variations in manifold suction in said valve controlled fuel passage, means for supplying air to each of said main wells above the fuel level therein, and a plurality of idling wells one of which is connected with each of said main wells so as to receive fuel therefrom.

17. A downdraft dual carburetor comprising a constant level float chamber, a housing enclosing the float chamber and spaced therefrom to provide for the passage of air around said chamber, said housing having a horizontal air inlet passage at one end, and two parallel mixture outlet passages in the bottom of said housing below the float chamber, a shaft extending through both said mixture outlet passages at a right angle to the axis of the air inlet passage and having two throttle valves thereon for controlling the flow of combustible mixture from the carburetor, two vertical primary Venturi tubes supported by the float chamber so that they communicate with the air passage at their upper ends and with the mixture outlet passages at their lower ends, secondary Venturi tubes formed in the mixture outlet passages into which the primary Venturi tubes project along the axis thereof, a plurality of main fuel wells one of which is associated with each of the primary venturis, a fuel nozzle connecting each of the wells with its associated primary Venturi tube, a single valve controlled fuel passage for supplying fuel from the float chamber to both of said main wells, a plurality of additional fuel passages of fixed area for supplying fuel from the float chamber to said wells, one of which is associated with each of said wells, a valve operable in response to variations in manifold suction in said valve controlled fuel passage, means for supplying air to each of said main wells above the fuel level therein, means associated with each fuel well for progressively admitting an increasing quantity of air to pass from said well into its associated fuel nozzle upon lowering of the fuel level in said wells.

18. A downdraft dual carburetor comprising a constant level float chamber, a housing enclosing the float chamber and spaced therefrom to provide for the passage of air around said chamber, said housing having a horizontal air inlet passage at one end, and two parallel mixture outlet passages in the bottom of said housing below the float chamber, a shaft extending through both said mixture outlet passages at a right angle to the axis of the air inlet passage and having two throttle valves thereon for controlling the flow of combustible mixture from the carburetor, two vertical primary Venturi tubes supported by the float chamber so that they communicate with the air passage at their upper ends and with the mixture outlet passages at their lower ends, secondary Venturi tubes formed in the mixture outlet passages into which the primary Venturi tubes project along the axis thereof, a plurality of main fuel wells one of which is associated with each of the primary venturis, a fuel nozzle connecting each of the wells with its associated primary Venturi tube, a single valve controlled fuel passage for supplying fuel from the float chamber to both of said main wells, a plurality of additional fuel passages for supplying fuel from the float chamber to said wells one of which is associated with each of said wells, means for supplying air to each of said wells above the fuel level therein, a plurality of idling fuel wells, one of which is connected with each of said main wells so as to receive fuel therefrom, said main fuel wells being so arranged with respect to the float chamber and the volume of fuel therein that the gravity head effective to cause a flow of fuel from the fuel nozzle is substantially unchanged upon change in angle of inclination of the carburetor.

ELMER OLSON.

REFERENCES CITED

The following references are of record in the file of this patent:

UNITED STATES PATENTS

| Number | Name | Date |
|---|---|---|
| 1,453,390 | Bessom | May 1, 1923 |
| 2,127,444 | Emerson | Aug. 16, 1938 |
| 2,212,946 | Mock et al. | Aug. 27, 1940 |
| 2,327,300 | Boller | Aug. 17, 1843 |

FOREIGN PATENTS

| Number | Country | Date |
|---|---|---|
| 233,788 | Great Britain | May 15, 1925 |
| 470,962 | Great Britain | Aug. 25, 1937 |